(12) United States Patent
Erickson et al.

(10) Patent No.: US 11,887,177 B2
(45) Date of Patent: Jan. 30, 2024

(54) PART RE-ORDER BASED ON PART-SPECIFIC SENSOR DATA

(71) Applicant: Hewlett-Packard Development Company, L.P., Spring, TX (US)

(72) Inventors: Kristopher J. Erickson, Palo Alto, CA (US); Jarrid Wittkopf, Palo Alto, CA (US); Rafael Ballagas, Palo Alto, CA (US); David Wayne George, Palo Alto, CA (US); Lihua Zhao, Palo Alto, CA (US); William J. Allen, Corvallis, OR (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 11 days.

(21) Appl. No.: 17/414,507

(22) PCT Filed: Jun. 18, 2019

(86) PCT No.: PCT/US2019/037679
§ 371 (c)(1),
(2) Date: Jun. 16, 2021

(87) PCT Pub. No.: WO2020/256700
PCT Pub. Date: Dec. 24, 2020

(65) Prior Publication Data
US 2022/0101411 A1 Mar. 31, 2022

(51) Int. Cl.
G06Q 30/00 (2023.01)
G06Q 30/0601 (2023.01)
G06K 7/10 (2006.01)
G06Q 10/20 (2023.01)

(52) U.S. Cl.
CPC ..... *G06Q 30/0633* (2013.01); *G06K 7/10297* (2013.01); *G06Q 10/20* (2013.01); *G06Q 30/0641* (2013.01)

(58) Field of Classification Search
CPC .............................................. G06Q 30/06–08
See application file for complete search history.

(56) References Cited

U.S. PATENT DOCUMENTS

| | | | |
|---|---|---|---|
| 6,587,748 B2 | 7/2003 | Baack | |
| 9,378,522 B2 | 6/2016 | Cruz | |
| 9,656,428 B2 | 5/2017 | Voris et al. | |
| 9,744,726 B2 | 8/2017 | Levine et al. | |
| 10,226,916 B2 * | 3/2019 | Kozlak | B33Y 40/20 |
| 2014/0244439 A1 | 8/2014 | Cruz | |
| 2015/0375455 A1 | 12/2015 | Williams et al. | |
| 2018/0104898 A1 | 4/2018 | Lameris et al. | |
| 2019/0087256 A1* | 3/2019 | Horrell | G06F 11/079 |

FOREIGN PATENT DOCUMENTS

| | | |
|---|---|---|
| WO | WO-2018140021 A1 | 8/2018 |
| WO | WO-2018158282 A1 | 9/2018 |
| WO | WO-2019014192 A1 | 1/2019 |

\* cited by examiner

*Primary Examiner* — Ethan D Civan
(74) *Attorney, Agent, or Firm* — Shook, Hardy & Bacon L.L.P.

(57) ABSTRACT

In one example in accordance with the present disclosure, a system is described. The system includes a reader to read an identifier associated with a part. An extractor of the system extracts, based on the identifier, sensor output data for the part. A transmitter of the system transmits a re-order request for the part based on the sensor output data.

15 Claims, 6 Drawing Sheets

PART RE-ORDER BASED ON PART-SPECIFIC SENSOR DATA

BACKGROUND

Millions of products are made and introduced into the economic stream every day. Everything from household products to industrial machinery and all variety of products in between. These products are offered to consumers via a number of distribution channels. For example, products may be purchased via an online retailer. Consumers may also go to a brick-and-mortar store to purchase a product.

BRIEF DESCRIPTION OF THE DRAWINGS

The accompanying drawings illustrate various examples of the principles described herein and are part of the specification. The illustrated examples are given merely for illustration, and do not limit the scope of the claims.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Around the world, millions of products are produced every day. Everything from household products to industrial machinery and everything in between. Via a variety of distribution mechanisms, consumers can purchase or otherwise receive these products. It has never been easier for a consumer to acquire any product they desire. While product development, manufacturing, and distribution have created an environment where product access is greater than ever, certain developments to product management may even further increase their utility.

For example, over time products may deteriorate or fail. As a particular example, automobile components, while built to handle the stresses induced in that environment, may over time deteriorate and potentially fail. In some examples, the deterioration and subsequent replacement of a component is routine and expected. In other examples, the failure may be unexpected, undesired, and in some cases may result in user dissatisfaction.

Accordingly, product manufacturers are always cognizant of the lifecycle and potential failure of their products and attempt to remedy defects and potential failures. In some examples, manufacturers do nothing to anticipate the potential failure or defect and rather wait for such events to occur.

In other examples, manufacturers estimate the predicted failure based on imperfect criteria which may lead to inaccurate predictions. These inaccurate predictions may not be much better than no estimate at all.

In some examples, a failure may be predicted for a large number of products without consideration of the individual environment of a product. For example, a batch of widgets may have a predicted life, after which it is recommended the widgets be retired. However, it may be the case that certain widgets in the batch may actually function past the predicted life. In this example, functional widgets may be discarded based on the predicted life, notwithstanding their ability to function beyond the predicted life.

Accordingly, the present specification describes a method and a system for receiving sensor data from sensors embedded in a part. Based on the sensor output, the system may initiate a re-order of the part. For example, if sensor data indicates that a part is near its expected end-of-life, the system may initiate a re-order. In some examples, the re-order may be customized. For example, the system, in addition to determining that a part should be re-ordered, may determine a version of the part to re-order based on the information stored on or in the part, and in some examples following customer confirmation.

In some examples, the system may be disposed on a variety of computing devices including tablets, mobile phones, or any other device that has a scanner such as an RFID scanner that can read an identifier on or in the part. For example, a reader, which may be a camera disposed on a mobile phone or an RF scanner on a mobile phone, may be used. In this example, a user may simply scan an identifier associated with a part and be provided with information regarding part re-ordering and specifically a customized re-ordering based on information collected from a sensor disposed in the part.

Specifically, the present specification describes a system. The system includes a reader to read an identifier associated with a part. An extractor of the system extracts sensor output data for the part based on the identifier. A transmitter transmits a re-order request for the part based on the sensor output data.

The present specification also describes a method. According to the method, an identifier is read from a storage element associated with a part and sensor output data for the part is extracted based on the identifier. A failure of the part is predicted based on the sensor output data and a re-order request for the part is transmitted based on the sensor output data and a predicted failure.

In another example, the reader reads an identifier from a storage element embedded in a three-dimensional (3D) printed part and the extractor extracts an output from a sensor embedded in the 3D printed part based on the identifier. In this example, the system also includes a database of recorded failures for 3D printed parts. A failure predictor of the system predicts a failure of the 3D printed part based on 1) the output from the sensor and 2) recorded failures of 3D printed parts with similar characteristics. A modifier of the system modifies a re-order request for the part based on the output from the sensor and a transmitter transmits the re-order request for the part based on the output from the sensor.

In other words, as parts approach an end-of-life stage, tagged parts, such as RFID-tagged parts, may automatically provide information about what the part was, which version cycle it was, and possibly indicating that a newer version of the part be ordered as opposed to the original version which was being used. Pre-emptive ordering of parts could also be enabled when a better version of the part becomes available.

Accordingly, by attaching a storage element, such as a radio-frequency identification (RFID) chip to a part, each part can obtain a unique identity. This identity may be used throughout the lifecycle of the part, allowing for tracking of information for that part.

In some examples, the sensor data may be stored at a remote database. However, in some examples, by utilizing an electronic tag, such as an RFID chip, some of that information can be stored on the part itself. With an electronic protocol like RFID, the part may be read by an appropriate reader at any time by the manufacturer, intermediary, or final user.

Such systems and methods 1) facilitate predictive failure of a part; 2) facilitate automatic re-ordering of a part; and 3) provide a user with a part version consistent with their particular use conditions. However, it is contemplated that the devices disclosed herein may address other matters and deficiencies in a number of technical areas.

As used in the present specification and in the appended claims, the term, "reader," "extractor," "transmitter," "failure predictor," and "modifier," refer to various hardware components, which may include a processor and memory. The processor may include the hardware architecture to retrieve executable code from the memory and execute the executable code. As specific examples, the reader as described herein may include computer readable storage medium, computer readable storage medium and a processor, an application specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer usable program code for use by or in connection with an instruction execution system, apparatus, or device. The memory may have many types of memory including volatile and non-volatile memory. For example, the memory may include Random Access Memory (RAM), Read Only Memory (ROM), optical memory disks, and magnetic disks, among others. The executable code may, when executed by the respective component, cause the component to implement at least the functionality described herein.

Figure 1:
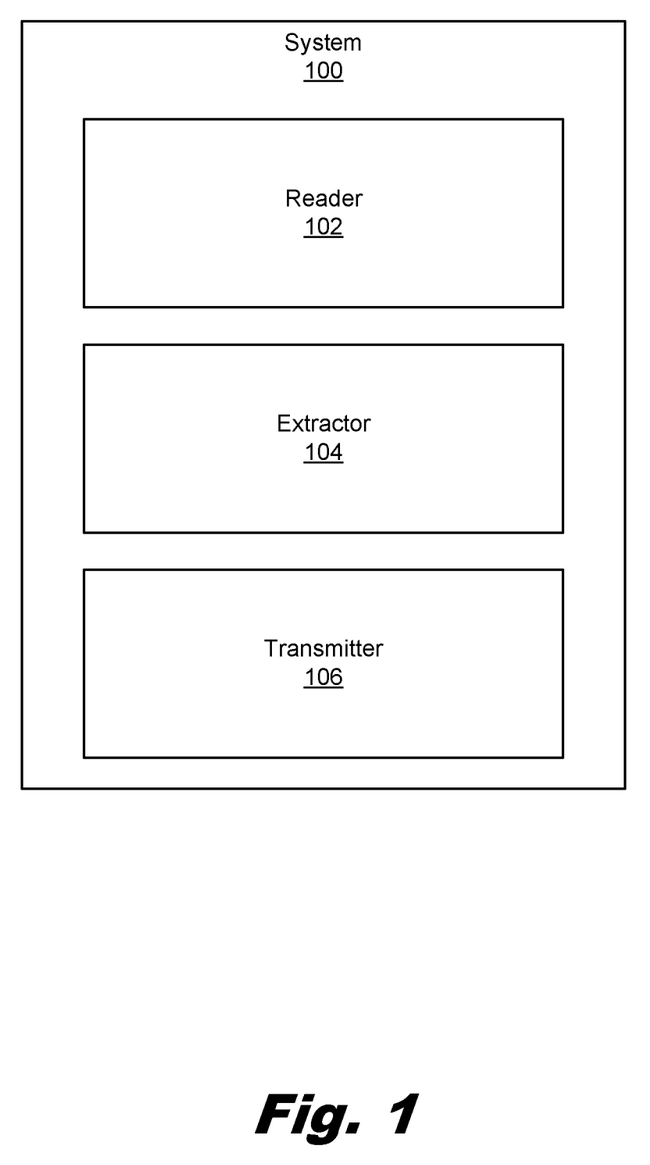
FIG. 1 is a block diagram of a system for re-ordering parts based on part-specific sensor data, according to an example of the principles described herein.

Turning now to the figures, FIG. 1 is a block diagram of a system (100) for re-ordering parts based on part-specific sensor data, according to an example of the principles described herein. In general, the system (100) may be disposed in any variety of computing devices including, but not limited to mobile devices, smart phones, tablets, etc. In other examples, the system (100) may be a standalone hardware device. For example, the system (100) may be disposed in a standalone electronic device with the main functionality being to extract information from RFID-tagged parts. Such standalone electronic devices may be disposed in a home, manufacturing facility, or other location.

As described above, the system (100) provides for the re-ordering of parts based on sensor data extracted from the part. Without such a system (100), a user may have little to no information available regarding the potential lifecycle of a part and may therefore re-order a part following part failure. This may result in dissatisfaction and inefficient use of the part as a user would have to be without a part for a period of time following failure until a new part is ordered and received. Moreover, the consumer may re-order the same part, which would be susceptible to the same failure due to similar use circumstances. Accordingly, the present system (100) provides for a smart re-ordering which may collect use data and suggest a particular version of the product more specifically suited for the use conditions and may re-order a part pre-emptively before the part fails such that a user does not have to deal with the inconvenience of not having a functioning product.

The system (100) includes a reader (102) to read an identifier associated with a part. That is, each part may be uniquely identified via an identifier such as an ID number. In some examples, the identifier may be read from a storage element disposed on the part itself. For example, a part may include an RFID tag that is disposed on a surface of the part. In this example, the reader (102) which may be an RF scanner can interrogate the storage element to acquire the identifier. In another example, the storage element may be embedded in the part itself.

The storage element may be of a variety of types. For example, in some cases, the part is a 3D printed part. In this example, the identifier may be embedded in the 3D printed part. In this example, an additive manufacturing system forms the 3D printed part. This may be done in a number of ways including multi-jet fusion, metal-jet fusion, polymer sintering, selective laser sintering, and selective laser melting. In yet another example, the additive manufacturing process may involve using a light source to cure a liquid resin into a hard substance. Such an operation may be referred to as stereolithography.

In any of these examples, deposition of layers of build material may be paused such that a storage element such as an RFID tag or other electronic tag can be placed in a body of the 3D printed part. Printing is resumed, thereby embedding the storage element in the body of the 3D printed part. While specific reference is made to RFID storage elements, other types of storage/transmission elements may also be used including, but not limited to ultra-high frequency wireless, or other wireless, communication and near field communication.

In any of these examples, 3D printing may be paused to place an electronic storage element in the 3D printed part. In other examples, the storage element may be simply attached to a surface of a part, for example via an adhesive. In yet another example, the storage element may be printed on a surface of the part. While specific reference is made to many ways to dispose a storage element on a part, any number of methods may be used so long as an identifier is written onto and readable from a part.

The reader (102) may be of a variety of types and may be selected based on the storage element. For example, the storage element may be a radio-frequency identification (RFID) tag. In this example, the reader (102) may be an RFID reader. In this example, the RFID tag receives electromagnetic energy from the RFID reader (102) antenna. Then, using its own internal battery or energy harvested from the reader (102), the tag sends radio waves back to the reader (102). The reader (102) picks up the RFID tag radio waves and decodes them into an identifier. Using an RFID tag and an RFID reader (102) may be beneficial in that it can operate without line-of-sight communication. That is, as described above, in some examples, the storage element is embedded into build material, i.e., the 3D printed part. In this example, the information stored on the RFID chip can be read by a reader (102) through the body of the 3D printed part. As described above, such an RFID reader (102) may be found on a portable computing device such as a smart phone, tablet, another handheld electronic device, or a standalone device.

While particular reference is made to a particular reader (102) such as one to read an RFID tag, a variety of types of readers (102) may be implemented that rely on different communication protocol. For example, the reader (102) may be a UHF, or other, wireless scanner or a near-field communication scanner among others.

As will be described below, the storage element may be incorporated into the part at different times. For example, an automated component placement system installed on the additive manufacturing system may place the storage element during the manufacturing process itself (in-situ placed chip). In another example, the chip may be placed during, or after, the part has been post-processed.

The system (100) also includes an extractor (104) to extract sensor output data for the part based on the identifier. That is, components other than a storage element may be disposed in or on a part. For example, a sensor may be embedded in a 3D printed part. The sensor may be of a variety of types. For example, the sensor may be a temperature sensor to monitor a temperature of the part as it is being formed and throughout its life. The sensor may be a moisture sensor to monitor a humidity of the part as it is being formed. Other examples of sensors that may be placed into the build material include a strain gauge, a stress gauge, and a displacement sensor to determine different forces exerted on the part. As yet another example, the sensor may be a locating sensor such as a global positioning sensor.

In this example, the extractor (104) extracts information from the other sensors disposed on or in the part. Such extraction may be during any stage of the part's lifecycle. Accordingly, the sensor output data may indicate conditions during any stage of the part's lifecycle. This information may be used in aiding in re-ordering of a part.

For example, the sensor output may indicate manufacturing conditions, post processing conditions, and use conditions. For example, an embedded strain gauge may indicate a strain induced in the part throughout its life.

As another example, a global positioning sensor may indicate a location of an end use. Global positioning sensor output data may indicate a particular version is more suitable for given circumstances. For example, in re-ordering a vehicle part, a global positioning sensor may indicate that the part is to be used in a location where cold temperatures are prevalent. Based on this global positioning output, a vehicle part that is rated to lower temperatures may be recommended to a user.

As yet another example, analysis of a part during post process testing may indicate how close the part's actual geometry is to an intended geometry, which may also be predictive of failure.

Other output data may include part design information. Examples of part design information includes raw material information, part dimensions, part characteristics, and manufacturing device type. In some examples, part design information may include everything in the provenance of the files and materials used such as a version of the computer-application drafting (CAD) application used.

While specific reference is made to a few specific sensor outputs that are extracted, other outputs may also be extracted or otherwise determined and eventually used to trigger a re-order of the part in its various versions.

In other words, during the lifecycle of the part, there is information that can be tied to specific parts using an associated identifier (from the RFID tag or other storage element) and a database. With RFID-tagged parts which also have embedded sensor systems, information about performance of the part during it final use period can be obtained. This could include information like strain information from an embedded strain gauge, possibly allowing for the predictive failure of a part prior to its actual failure. This could allow for automated reordering of a part to be triggered.

In some examples, a sensor may be continually activated. In other examples, the sensor may be activated by the storage element. For example, the storage element may be an RFID tag that upon receiving a voltage activates the sensor to measure a characteristic and to pass that characteristic either to a storage element or to update an entry in a database.

The sensor output data may be extracted from any number of sources. In one example, the storage element may include just a unique identification of the part and the sensor output data itself may be located on a remote database which is identified via the unique identification. In this example, a transmitting antenna may also be embedded in the part such that the sensor output may be transmitted to the database. Accordingly, the sensor output data is extracted from the database. That is, the identifier may reference a location on a remote server where the sensor output data is located. Accordingly, the reader (102) upon reading the identifier provides a location from which the extractor (104) can collect the sensor output data.

Moreover, as used in the present specification and in the appended claims the term "extract" refers to an operation wherein information/data is pulled from the 3D printed object (FIG. 2, 218) or the database. That is, as mentioned above, data may be stored on a storage element on the 3D printed object or at a remote location identified by the storage element. Data that is extracted from either location is information that is read from those locations. For example, a database may include information, and the extractor (1334), may upon receiving an indication of the identifier, read the information from the database. That is, the identifier may point to an address in the database where the information about post processing is held, and the extractor may receive that address, locate the address on the database, and read, or extract, the contents found at that location.

However, if a tag with more storage space is used, additional information could possibly be on-boarded onto the chip itself or a connected memory module. For example, storage element may include the identifier and the sensor output data, or a portion thereof. For example, the sensor on the embedded part may be coupled directly to the storage element via electrical traces. In this example, the design file may be extracted from the storage element on, or embedded in, the manufactured part. That is, while reference was made to an RFID tag being the storage element, other and larger storage elements may be embedded or disposed on the part, which large storage elements may include additional space on which the sensor output data may be written. The contents of this storage element may be extracted by the extractor (104).

The system (100) also includes a transmitter (106) to transmit a re-order request for the part based on the sensor output data. That is, as described above, the sensors may detect a variety of conditions of the part including stresses on the part. This information may be used to predict a failure of the part. For example, the stresses on the part may be associated, via a database, with stresses measured in other parts. If these other parts failed, as indicated in the database, the system (100) may determine that the target part is also susceptible to a similar failure. Accordingly, with such a mapping and recorded stresses on the part, it may be determined that the part may fail at a particular point in time. Accordingly, the transmitter (106), either automatically or with user approval, may re-order the part near this point in time.

In some examples, the transmitter (106) not only transmits a re-order request, but alters the re-order request, again based on the sensor output data. Such an alteration may take many forms. For example, a new version of the part may be re-ordered based on sensed use conditions. That is, new versions of a part may be developed over time and sensed use conditions may indicate that a particular version is more suited for the environment. That is, one way to alter a re-order request is to upgrade the part. In this example, the sensor in the part may measure data usable to determine usage patterns or environmental conditions. The system (100) may then determine whether a new version (or which new version) of the part would be appropriate based on the determined usage patterns and order that version.

In another example, the alteration may include re-ordering a version of the part based on a type of predicted failure. For example, if the system (100) knows how the part is going to fail based on the sensor data, then the system (100) could modify the re-ordered part to compensate for this kind of failure. For example, imagine that there are various usage patterns for a part that result in different failures, such as a car part that fails differently for short distance drivers versus long distance drivers. If the part fails in a way associated with a first usage pattern, the re-ordered part could be more tailored to the first usage. In other words, the alteration of the re-order request provides a customization of the re-ordered part based on the sensor data that is specific to that part.

Associating this information with an identifier on the part enhances product management. That is, without such a system (100), a user would have to deal with the effects of failure after they occur. However, using the current system (100) a part may be re-ordered before it fails and the re-ordered part may be specifically tailored to their particular use environment based on sensor output data.

Such a system (100) may also allow a business to offer life-time guarantees on their products or allow for other business models (like products as a service), having better assurance that such a policy/approach can be more economically entered into as they could replace parts when needed, instead of on a particular set schedule. Such a system (100) may also help streamline the replacement process (parts know what is to be replaced instead of service visits from product experts). The system (100) could also make businesses more sustainable.

As described above, the system (100) may be provided in a number of environments. For example, the system (100) may be included in a home device that is constantly scanning any and all connected tagged parts to determine if any need to be re-ordered. In another example, the home device may scan periodically. In either example, the system (100) may be a single standalone device or multiple standalone devices distributed throughout the home or office. In another example, the system (100) may be disposed on a mobile device that scans parts as a user passes by.

In another example, the system (100) may be disposed in a manufacturing facility. In this example, there may be hundreds of tagged parts along the manufacturing chain. In this example, the system (100) may scan multiple tagged parts and highlight any part that is defective or prone to failure and take appropriate remedial action such as removing the items from the production channel.

Figure 2:
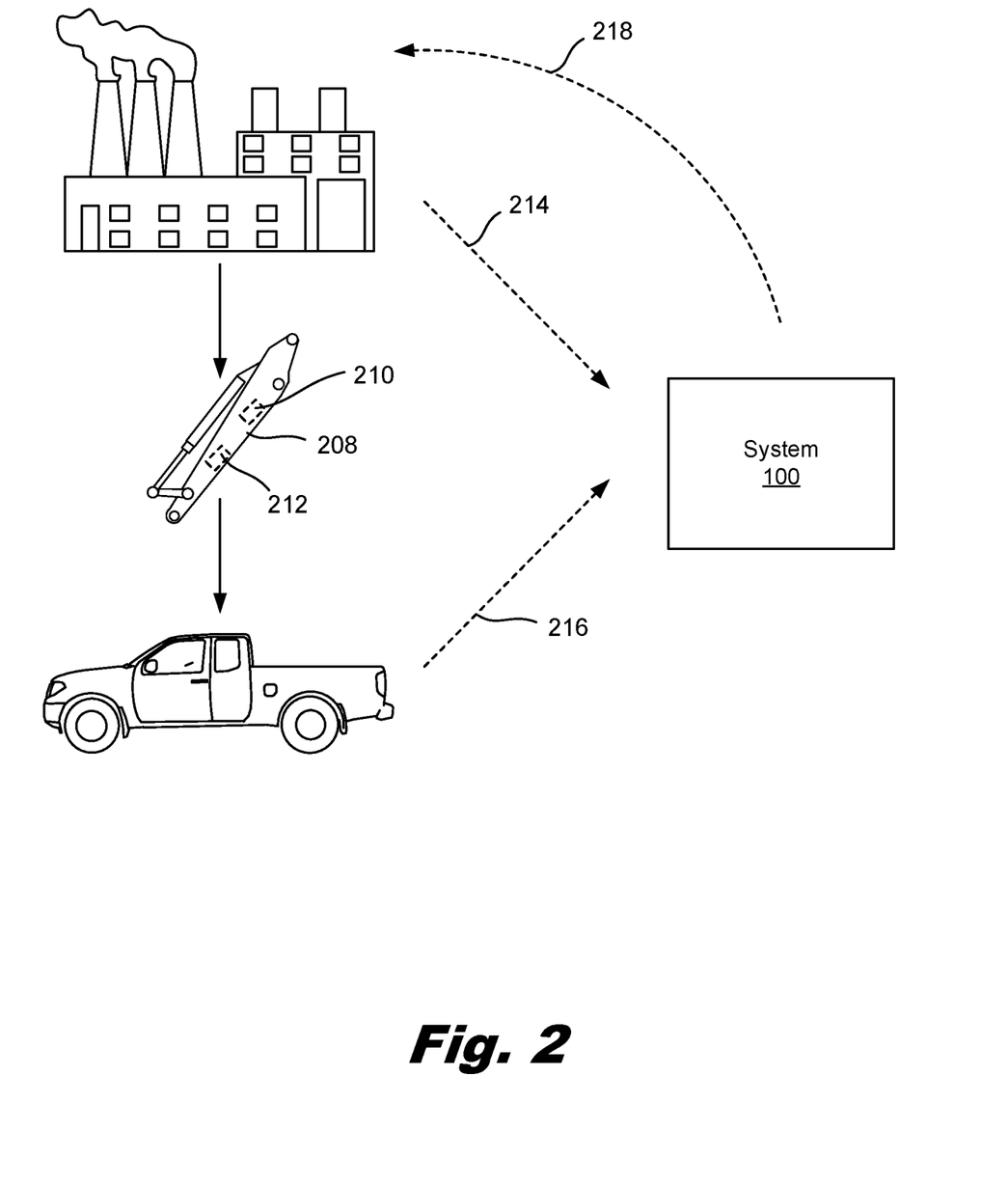
FIG. 2 is a diagram of re-ordering parts based on part-specific sensor data, according to an example of the principles described herein.

FIG. 2 is a diagram of re-ordering parts (208) based on part-specific sensor (212) data, according to an example of the principles described herein. In the example depicted in FIG. 2, the part (208) is a component of a vehicle. While FIG. 2 depicts a particular part (208) which is manufactured in a particular way, the part (208) may be a variety of types, including a 3D printed part (208). In the example depicted in FIG. 2, the part (208) was manufactured in a plant and distributed to an automobile owner. As described above, the part (208) may include embedded components such as a storage element (210) and a sensor (212). The storage element (210) and the sensor (212) are depicted in FIG. 2 as dashed lines to indicate their positioning within the part (208). The storage element (210) may hold a variety of data including at least an identifier for the part (208) and in some cases sensor (212) output data, or at least a portion thereof.

The sensor (212) may be of a variety of types such as a global positioning sensor, a temperature sensor, a humidity sensor, a strain gauge, a stress gauge, or a displacement sensing system, among others. Throughout the life of the part (208), the sensor (212) may take measurements of conditions experienced by the part (208). Such measurements may be done periodically, as triggered by a storage element (210) that powers the sensor, or continually. In either case, the sensed information is passed to the system (100) either from the storage element (210) directly or from a remote database.

The sensed conditions may be reflective of different stages of the part (208) lifecycle. For example, when in the manufacturing facility, the sensor (212) may output manufacturing data (214) indicative of the manufacturing process including manufacturing conditions (such as print conditions for a 3D printed part) and post processing conditions. When in use, the sensor (212) may output use data (216) indicative of the use conditions. The system (100) collects this information and submits a re-order request (218) based on the sensed data. As described above, in some examples the system (100) alters the re-order request (218) before submitting. For example, a global positioning sensor may send use data (216) that indicates the part (208) is used in a vehicle that sees a lot of miles, such as a delivery truck. Accordingly, an altered re-order request (218) may be for a version of the part (208) that is built of more robust materials and thus rated to handle the kind of mileage seen by the part (208).

In some examples, the re-order request (218) may be automated. That is, the sensor (212) output data, whether it be the manufacturing data (214) or the use data (216) may indicate conditions which, based on historic information, are known to result in failure at a certain period of time. Accordingly, the system (100) may initiate the re-order request (218) prior to the expected failure such that the consumer may avoid the consequences of part (208) failure during use.

Figure 3:
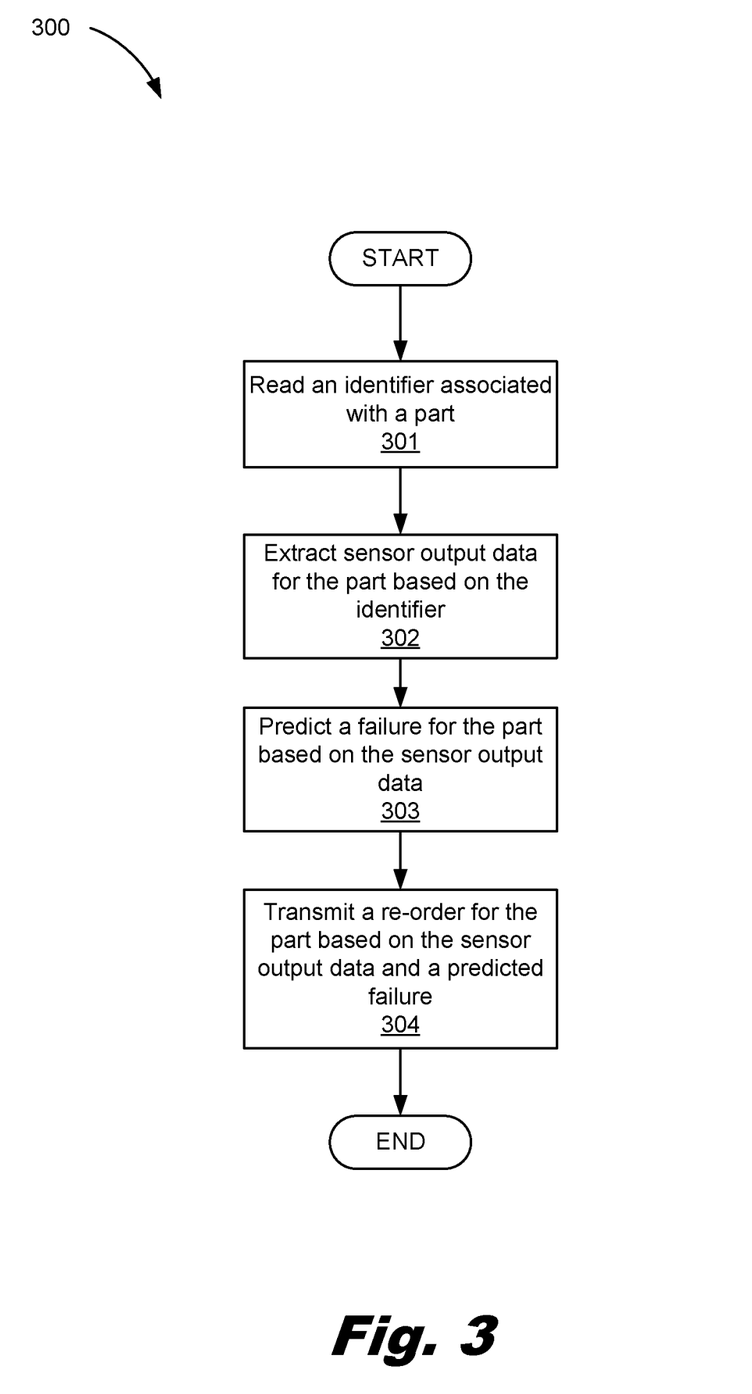
FIG. 3 is a flow chart of a method for re-ordering parts based on part-specific sensor data, according to an example of the principles described herein.

FIG. 3 is a flow chart of a method (300) for re-ordering parts (FIG. 2, 208) based on part-specific sensor (FIG. 2, 212) data, according to an example of the principles described herein. According to the method (300), an identifier that is associated with the part (FIG. 2, 208) is read (block 301), in some examples from a storage element (FIG. 2, 210) associated with the part (FIG. 2, 208). As described above, the identifier may be found on a storage element (FIG. 2, 210) that is disposed on, or in the part (FIG. 2, 208). Also as described above, this may be done in any number of ways including using an RFID scanner to interrogate an RFID storage element in a 3D printed part.

An extractor (FIG. 1, 104) then extracts (block 302) sensor (FIG. 2, 212) output data for the part (FIG. 2, 208) based on the identifier. That is, as described above, each part (FIG. 2, 208) has sensors (FIG. 2, 212) embedded therein that measure conditions experienced by the part (FIG. 2, 208) over its life including print conditions, post processing conditions, and use conditions among others. The sensor (FIG. 2, 212) output data may be extracted (block 302) from the storage element (FIG. 2, 210) itself or from a database associated with the part (FIG. 2, 208). In the case the sensor (FIG. 2, 212) output data is extracted (block 302) from a database, the location of the sensor (FIG. 2, 212) output data may be mapped to the identifier. That is, the identifier may include a pointer that dereferences the location in the database where the sensor (FIG. 2, 212) output data is stored. In some examples, the extracted information may be encrypted to protect against unwanted access and/or manipulation. Such an encryption could be used to verify the accuracy and integrity of returned data to ensure it has not been altered or tampered with.

A failure of the part (FIG. 2, 208) may then be predicted (block 303) based on the sensor (FIG. 2, 212) output data. That is, a failure predictor may map certain sensor (FIG. 2, 212) output data to detected defects and/or predicted failures.

In some examples, the prediction (block 303) of failure may be based on recorded failures of parts (FIG. 2, 208) with similar characteristics. That is, predictions (block 303) of whether certain sensed conditions indicate a potential failure come from data from other parts (FIG. 2, 208) which are deployed as well. For example, a database may include sensor (FIG. 2, 212) output data for a variety of parts (FIG. 2, 208). The database may also indicate failures of those parts (FIG. 2, 208). Accordingly, the database includes a correlation between sensed conditions and actual failures. As such, when certain conditions are measured for a part (FIG. 2, 208) that are similar to conditions correlated with part failure, a predicted (block 303) failure mode and timing may be made for the part (FIG. 2, 208).

With the prediction (block 303) in hand, the transmitter (FIG. 1, 106) transmits (block 304) a re-order request (FIG. 2, 218) for the part (FIG. 2, 208) based on the sensor (FIG. 2, 212) output data and a predicted failure. Specifically, the transmitter (FIG. 1, 106) may transmit a re-order request (FIG. 2, 218) prior to the time of the predicted failure. In an example, the re-order request (FIG. 2, 218) may be modified. That is, the re-order request (FIG. 2, 218) may not be for the exact same part (FIG. 2, 208), but may be for a variation of the part (FIG. 2, 208). The alteration may be based on the sensor (FIG. 2, 212) output data. For example, it may be the case that the failure recorded in the database indicates that when certain strain conditions are seen, the mode of failure is a crack at a particular junction of part (FIG. 2, 208) components. Accordingly, the re-order request (FIG. 2, 218) may, instead of ordering the same part (FIG. 2, 208), may request a version of the part (FIG. 2, 208) that has a reinforced junction between these part (FIG. 2, 208) components.

In another example, the system (FIG. 1, 100) may find a reinforced joint in a part rarely fails under certain strain conditions. Accordingly, a re-order request for a part used in those certain strain conditions may be modified to provide a less expensive part with a reduced level of reinforcement that will still meet all criteria for system safety, reliability, and performance. Accordingly, the system helps where better parts are needed and also it can help tune and refine so as not to oversupply capabilities that are not necessary.

In yet another example, the alteration may be simply for an updated version of a part (FIG. 2, 208). As an example, the part (FIG. 2, 208) in use may be a second version and a third version may exist that enhances certain functionalities of the part (FIG. 2, 208). Accordingly, rather than re-ordering the second version previously used by the consumer, the transmitter (FIG. 1, 106) may submit a re-order request (FIG. 2, 218) for the third version of the part (FIG. 2, 208). In another example, it may be that a first version, rather than the second version may be more appropriate based on the use characteristics. In this example, the transmitter (FIG. 1, 106) may submit a re-order request (FIG. 2, 218) for the first version of the part (FIG. 2, 208) rather than the second version. Thus, the present method (300) allows for use- and part-specific failure prediction and part (FIG. 2, 208) reordering.

As another example, the alteration may be for just a different, not necessarily updated, version of a part (FIG. 2, 208). For example, different versions may be manufactured with different characteristics. For example, some parts (FIG. 2, 208) may be made of a more robust, but perhaps more expensive, material while other versions may be made of a more fragile, but more cost-effective material. Accordingly, the alteration may be based on an indication that a different version, i.e., more robust or more cost effective, is more appropriate given the use characteristics.

Figure 4:
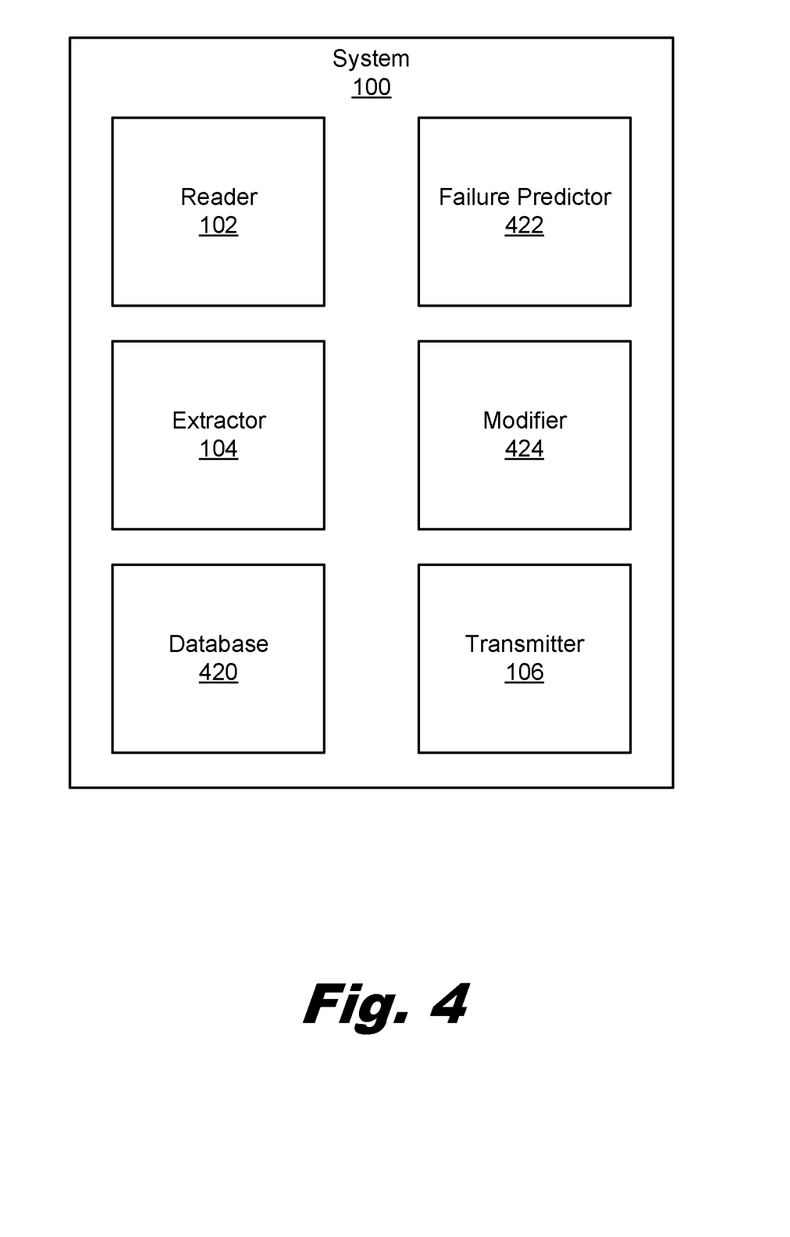
FIG. 4 is a block diagram of a system for re-ordering parts based on part-specific sensor data, according to another example of the principles described herein.

FIG. 4 is a block diagram of a system (100) for re-ordering parts (FIG. 2, 208) based on part-specific sensor (FIG. 2, 212) data, according to another example of the principles described herein. As described above, the system (100) includes a reader (102). In one example, the reader (102) is to read an identifier from a storage element (FIG. 2, 210) embedded in a 3D printed part (FIG. 2, 208). The system (100) also includes an extractor (104) to extract an output from a sensor (FIG. 2, 212) which is also embedded in the 3D printed part (FIG. 2, 208). The system (100) also includes a transmitter (106) to transmit a re-order request (FIG. 2, 218) for the part (FIG. 2, 208) based on the output from the sensor (FIG. 2, 212).

In some examples, the system (100) includes additional components. For example, as described above, the failure prediction may be based on historical information, specifically a mapping of historical sensor outputs and any failures that were recorded. Accordingly, the system (100) include a database (420) of recorded failures for parts (FIG. 2, 208), such as 3D printed parts. From such a database (420), a target part (FIG. 2, 208) with certain characteristics may be associated with other parts (FIG. 2, 208) that have similar characteristics. As failures are recorded for these other parts (FIG. 2, 208), a failure may be predicted for the target part (FIG. 2, 208) based on the similarity of the sensor outputs and the failures of the other parts (FIG. 2, 208).

In some examples, a definition of failure may be adjusted based on a more thorough understanding of the part (FIG. 2, 208) performance landscape based upon other parts (FIG. 2, 208) being tested and their design/performance correlations.

Accordingly, the system (100) also includes a failure predictor (422) to predict a failure for the 3D printed part (FIG. 2, 208) based on the output from the sensor (FIG. 2, 212) of the part (FIG. 2, 208) as well as recorded failures of parts having similar characteristics. As used in the present specification and in the appended claims, the term "characteristics" refers to similar manufacturing conditions, similar features, and/or similar use conditions.

The system (100) may also include a modifier (424) to modify a re-order request (FIG. 2, 218) for the part (FIG. 2, 208) based on the output from the sensor (FIG. 2, 212). That is, as described above, a re-order request (FIG. 2, 218) may not be for the same part (FIG. 2, 208) but may be for a different version of the part (FIG. 2, 208). Accordingly, the modifier (424) may adjust a form or other information that is passed to the manufacturer to re-order a part (FIG. 2, 208) so as to provide the consumer with a version of the part (FIG. 2, 208) that is better suited to a particular use environment based on use information extracted from the sensor (FIG. 2, 212).

It should be noted that some of the components of the system (100) may be remove from the part and/or the location where the part is used and/or made. As a specific example, the extractor (104), database (420), failure predictor (422) and/or modifier (424) may be implemented on a server that is remote from the reader (102) and/or transmitter (106).

Figure 5:
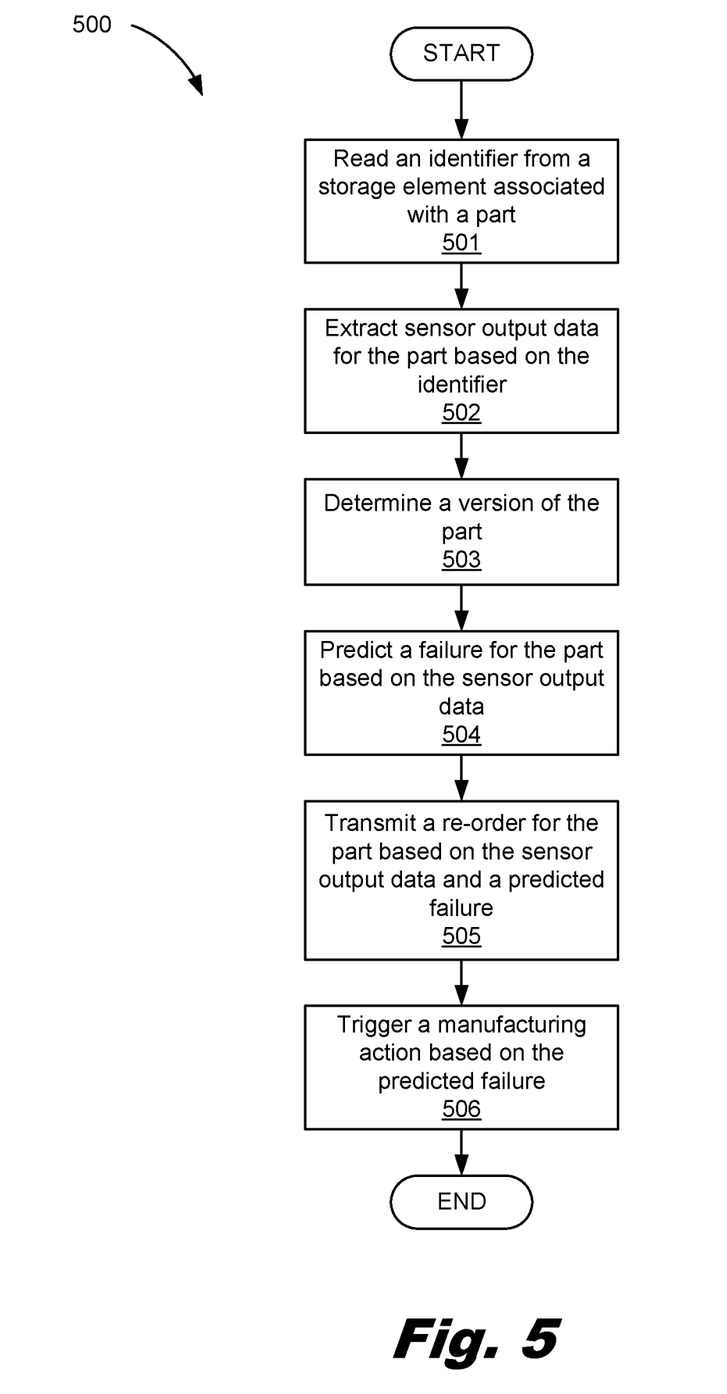
FIG. 5 is a flow chart of a method for re-ordering parts based on part-specific sensor data, according to an example of the principles described herein.

FIG. 5 is a flow chart of a method (500) for re-ordering parts (FIG. 2, 208) based on part-specific sensor (FIG. 2, 212) data, according to an example of the principles described herein. In the example depicted in FIG. 5, an identifier is read (block 501) from a storage element (FIG. 2, 210) associated with a part (FIG. 2, 208) and the sensor (FIG. 2, 212) output data is extracted (block 502) based on the identifier. These operations may be performed as described above in connection with FIG. 3.

In this example, a version of the part (FIG. 2, 208) is determined (block 503). This may include reading the version from the storage element (FIG. 2, 210) disposed on the part (FIG. 2, 208), or extracting the version number from a database (FIG. 4, 422) location identified in the storage element (FIG. 2, 210). In some examples determining (block 503) the version of the part (FIG. 2, 208) may include reading a version number. In other examples, determining (block 503) the version of the part (FIG. 2, 208) may be based on other information such as part characteristics. For example, different versions of a part (FIG. 2, 208) may have different dimensions, different surface finishes, etc. Accordingly, in this example the system (FIG. 1, 100) identifies these part characteristics, for example from a database (FIG. 4, 420), and associates them with a particular version of the part (FIG. 2, 208).

The system (FIG. 1, 100), and more particularly the failure predictor (FIG. 4, 422), predicts (block 504) a failure for the part (FIG. 2, 208) based on the sensor (FIG. 2, 212) output data and transmits (block 505) a re-order request (FIG. 2, 218) for the part (FIG. 2, 208) based on the sensor (FIG. 2, 212) output data and the predicted (block 504) failure. In some examples, these operations may be performed as described above in connection with FIG. 3. Specifically, in the example where a part (FIG. 2, 208) version is determined (block 503) the re-order request (FIG. 2, 218) is further based on the determined version for the part (FIG. 2, 208).

In some examples, the system (FIG. 1, 100) in addition to transmitting a re-order request (FIG. 2, 218) may trigger additional actions. Specifically, the method (500) may include triggering (block 506) a manufacturing action based on the predicted failure. Such a manufacturing action may take many forms. For example, it may include stocking of more parts (FIG. 2, 208) based on the re-order request (FIG. 2, 218). That is, for each request for a new part (FIG. 2, 208), a manufacturer may make a new part (FIG. 2, 208) to maintain inventory at a certain level. This may become more relevant as multiple re-order requests (FIG. 2, 218) are made. For example, if multiple customers re-order parts (FIG. 2, 208) at the same time, the system (FIG. 1, 100) may trigger stocking more of these parts (FIG. 2, 208) such that a manufacturer always has sufficient quantities on hand.

As yet another example, the manufacturing action may be to redesign a part (FIG. 2, 208). That is, the failure of a particular part (FIG. 2, 208), if occurring frequently enough, may be indicative of a systemic defect with the part (FIG. 2, 208). If not a defect, it may just shed light on a change that could be made to increase the performance of the part (FIG. 2, 208). Accordingly, the re-order request (FIG. 2, 218) and/or the sensor (FIG. 2, 212) output data may trigger a redesign of the part (FIG. 2, 208) based upon the expected failure of the part (FIG. 2, 208). While particular reference is made to a few types of manufacturing actions, any number of manufacturing actions may be triggered.

Figure 6:
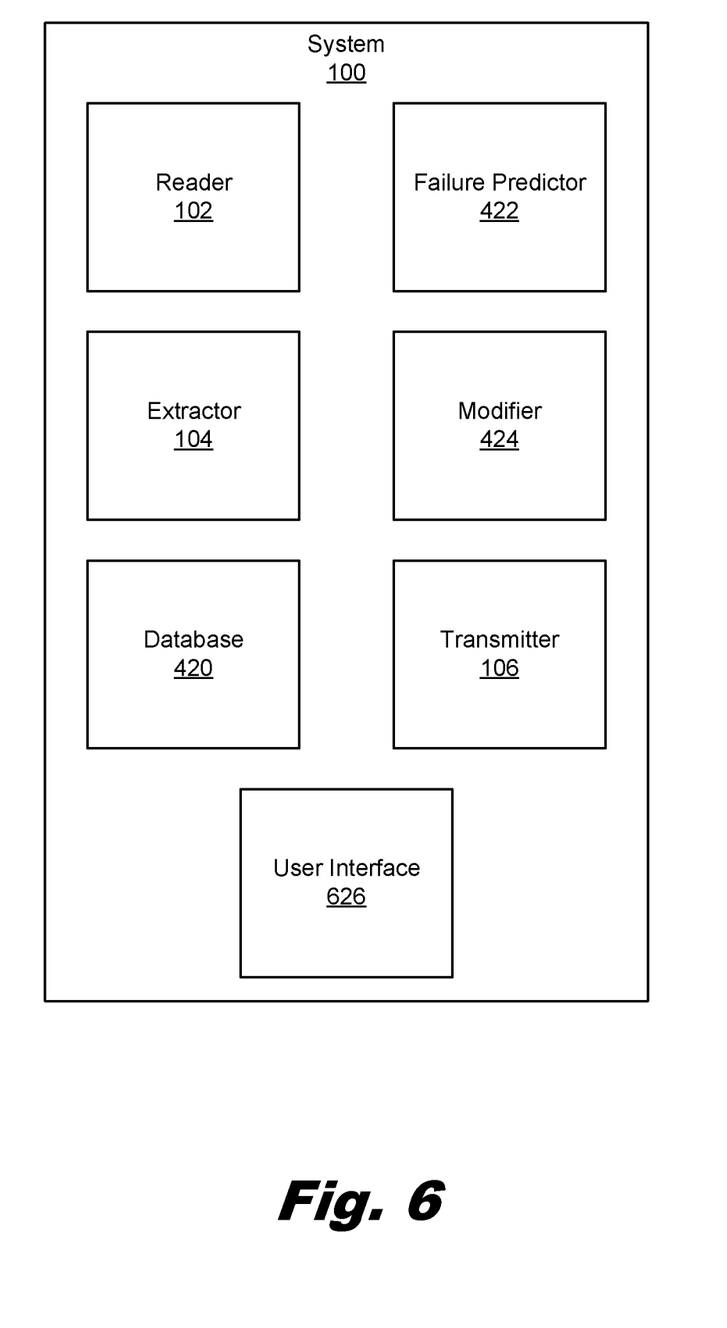
FIG. 6 is a block diagram of a system for re-ordering parts based on part-specific sensor data, according to another example of the principles described herein.

FIG. 6 is a block diagram of a system (100) for re-ordering parts (FIG. 2, 208) based on part-specific sensor (FIG. 2, 212) data, according to another example of the principles described herein. As described above, the system (100) may include a reader (102), extractor (104), database (420), failure predictor (422), modifier (424), and transmitter (108) as described above.

In this example, the system (100) includes additional components. Specifically, the system (100) includes a user interface (626). As described above, in some examples the system (100) may be disposed on a mobile device, smartphone, tablet, or standalone device among other electronic devices. The user interface (626) may present various pieces of information to the user. For example, the user interface (626) may prompt a user for authorization to transmit a re-order request (FIG. 2, 218). That is, in this example, rather than automatically re-ordering the part (FIG. 2, 208), or a variation thereof, the system (100) requests user approval to do so.

The user interface (626) may present other types of information as well. For example, the user interface (626) may notify a user of an updated version of a part (FIG. 2, 208), and/or a predicted failure of the part (FIG. 2, 208) as described above. In yet another example the user interface (626) may provide the user with a recommended version, which may not be an updated version, of the part (FIG. 2, 208). For example, based on use conditions, it may be the case that an older version of the part (FIG. 2, 208) may be most beneficial to a user based on the use environment.

The user interface (626) may also present additional information to a user. For example, if just a portion of a part (FIG. 2, 208) is expected to have the failure, the user interface (626) may provide instructions on how to replace the component. As yet another example, the user interface (626) may provide suggestions of contractors that could perform the replacement/repair. In this example, in addition to providing the notification, the system (100) may automatically, or with the user's approval, reach out to the contractor for part repair/replacement or schedule an appointment with a repair shop. While specific reference is made to specific types of information presented to the user, other information may be presented to the user via the user interface (626) as well.

Such systems and methods 1) facilitate predictive failure of a part; 2) facilitate automatic re-ordering of a part; and 3) provide a user with a part version consistent with their particular use conditions. However, it is contemplated that the devices disclosed herein may address other matters and deficiencies in a number of technical areas.

What is claimed is:

1. A system comprising:
   a camera associated with a user device to read an identifier associated with a part;
   an extractor to extract sensor output data from a sensor embedded in the part based on the identifier, wherein the sensor output data comprises a condition of the part captured by the sensor over a predicted part lifecycle; and
   a transmitter to transmit a redesign order comprising the sensor output data, the identifier, and a request to initiate a manufacturing action that includes redesign of the part.

2. The system of claim 1, wherein:
   the part is a three-dimensional (3D) printed part; and
   a storage element is embedded in the 3D printed part.

3. The system of claim 1, further comprising a failure predictor to predict a failure of the part based on the sensor output data.

4. The system of claim 3, wherein the failure predictor is to predict failure further based on recorded failures of parts with similar characteristics.

5. The system of claim 1, wherein the transmitter is to alter the redesign order based on the sensor output data.

6. The system of claim 5, wherein aft altering the redesign order comprises at least one of:
   re-ordering a redesigned version of the part based on use conditions; and
   re-ordering a version of the part based on the sensor output data.

7. The system of claim 1, wherein the sensor output data indicates at least one of:
   manufacturing conditions;
   post processing conditions;
   part design information; and
   use conditions.

8. A method comprising:
   reading, by a radio-frequency identification reader, an identifier from a storage element embedded in a part;
   extracting sensor output data for the part based on the identifier;
   predicting a failure for the part based on the sensor output data; and
   transmitting a redesign order comprising a request to initiate a manufacturing action that includes redesign of the part based on the sensor output data and the failure predicted for the part.

9. The method of claim 8, further comprising determining a version of the part, wherein the redesign order is further based on the version of the part.

10. The method of claim 8, wherein the sensor output data is extracted from at least one of:
    the storage element; and
    a location in a database identified by the identifier.

11. The method of claim 8, wherein the manufacturing action further comprises at least one of:
    stocking parts based on the failure predicted for the part; and
    ordering a redesign.

12. A system comprising:
    a radio-frequency identification reader to read an identifier from a storage element embedded in a three-dimensional (3D) printed part; and
    an extractor to extract an output from a sensor embedded in the 3D printed part based on the identifier
    a database of recorded failures for 3D printed parts;
    a failure predictor to predict a failure of the 3D printed part based on:
       the output from the sensor; and
       recorded failures of 3D printed parts with similar characteristics;
    a modifier to modify a redesign order for the part, the redesign order comprising a modified design file that is based on the output from the sensor, the modified design file being generated prior to transmission of the redesign order; and
    a transmitter to transmit the redesign order that comprises the modified design file with a request to initiate a manufacturing action, the manufacturing action to comprise redesign of the part that has failed based on the output from the sensor.

13. The system of claim 12, further comprising a user interface to prompt a user for authorization to transmit the redesign order.

14. The system of claim 12, further comprising a user interface to notify a user of at least one of:
    an updated version of the part;
    a recommended version of the part; and
    a predicted failure of the part.

15. The system of claim 12, wherein the user interface presents additional information to the user based on the output from the sensor.

* * * * *